(12) United States Patent
Kameo et al.

(10) Patent No.: US 10,747,639 B2
(45) Date of Patent: Aug. 18, 2020

(54) MONITORING DEVICE, MONITORING METHOD, AND NON-TRANSITORY COMPUTER-READABLE MEDIUM

(71) Applicant: MITSUBISHI HEAVY INDUSTRIES, LTD., Tokyo (JP)

(72) Inventors: Naruhisa Kameo, Tokyo (JP); Fumikado Anzai, Tokyo (JP); Etsuji Nishimae, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 44 days.

(21) Appl. No.: 16/267,632

(22) Filed: Feb. 5, 2019

(65) Prior Publication Data
US 2019/0278687 A1 Sep. 12, 2019

(30) Foreign Application Priority Data
Mar. 8, 2018 (JP) .................................. 2018-041794

(51) Int. Cl.
*G06F 12/14* (2006.01)
*G06F 11/34* (2006.01)
(Continued)

(52) U.S. Cl.
CPC ........ *G06F 11/3438* (2013.01); *G06F 11/327* (2013.01); *H04L 9/3278* (2013.01)

(58) Field of Classification Search
None
See application file for complete search history.

(56) References Cited

U.S. PATENT DOCUMENTS

| 9,876,645 B1* | 1/2018 | Ramalingam | H04L 9/3247 |
| 2016/0028544 A1* | 1/2016 | Hyde | G06F 3/0637 |
| | | | 380/44 |

(Continued)

FOREIGN PATENT DOCUMENTS

| JP | 5183517 | 4/2013 | |
| JP | 2017-173242 | 9/2017 | |
| JP | 2017173242 A * | 9/2017 | ............. G11C 29/44 |

*Primary Examiner* — Natisha D Cox
(74) *Attorney, Agent, or Firm* — Wenderoth, Lind & Ponack, L.L.P.

(57) ABSTRACT

A monitoring device includes: a PUF-information acquiring unit acquiring PUF-information; a first PUF-information change value calculating unit calculating a degree of change from PUF-information acquired at a previous time to PUF-information acquired at a current time as a first PUF-information change value; a second PUF-information change value calculating unit calculating a degree of change from initial PUF-information to the PUF-information acquired at the current time as a second PUF-information change value; an unauthorized use determining unit comparing the first PUF-information change value with a first threshold and determining that there is unauthorized use of the predetermined monitoring target device when the first PUF-information change value is greater than the first threshold; and a deterioration determining unit comparing the second PUF-information change value with a second threshold and determining that the predetermined monitoring target device has deteriorated when the second PUF-information change value is greater than the second threshold.

12 Claims, 8 Drawing Sheets

(51) Int. Cl.
*H04L 9/32* (2006.01)
*G06F 11/32* (2006.01)

(56) References Cited

U.S. PATENT DOCUMENTS

| | | | |
|---|---|---|---|
| 2016/0148680 A1* | 5/2016 | Yoshimoto | G11C 13/004 365/148 |
| 2016/0163179 A1* | 6/2016 | Matsumoto | G05B 13/042 340/540 |
| 2017/0277455 A1* | 9/2017 | Sunada | G06F 11/2284 |
| 2018/0241557 A1* | 8/2018 | Maes | H03M 13/6356 |
| 2019/0042480 A1* | 2/2019 | Khatib Zadeh | G06F 12/1458 |
| 2019/0207774 A1* | 7/2019 | Anzai | G09C 1/00 |

* cited by examiner

MONITORING DEVICE, MONITORING METHOD, AND NON-TRANSITORY COMPUTER-READABLE MEDIUM

TECHNICAL FIELD

The disclosure relates to a monitoring device, a monitoring method, and a non-transitory computer-readable medium. Priority is claimed on Japanese Patent Application No. 2018-041794, filed Mar. 8, 2018, the content of which is incorporated herein by reference.

BACKGROUND ART

For example, a device such as a gas turbine that requires control (a control target device) is controlled by a control device. There are cases in which a malicious person may exchange a part or the whole of a control device or unauthorizedly update connection destination information relating to a control device through an unauthorized access from outside such that switching of the control device controlling the control target device is performed. In such cases, there is a likelihood that the control target device will perform an abnormal operation due to unauthorized control of a control device to which switching has been performed, and a significant accident may occur. In addition, there is a likelihood that technologies may be leaked, and alteration and the like of a program and data may be performed through unauthorized control.

Accordingly, there is a need to detect and prevent unauthorized switching of the control device. In conventional technology, various technologies for detecting and preventing unauthorized switching are known. For example, in Patent Literature 1, a technology for detecting and preventing unauthorized switching using a physical quantity such as manufacturing variation, a difference between physical characteristics, and the like in electronic devices (semiconductor chips or the like) called a physically unclonable function (PUF) is disclosed. More specifically, in Patent Literature 1, a technology for detecting and preventing unauthorized switching of an electronic device by performing collation using PUFs as unique values of electronic devices is proposed.

CITATION LIST

Patent Literature

[Patent Literature 1] Japanese Patent No. 5183517

SUMMARY

However, reasons for a control target device performing an abnormal operation and causing a significant accident are not limited to unauthorized control according to unauthorized switching of a control device, and there are also cases in which a reason is abnormal control due to deterioration of the control device with respect to time. In a case in which deterioration of a control device with respect to time is detected using conventional technology, it is necessary to introduce a device other than a device used for detecting unauthorized switching of the control device. In addition, in order to prevent deterioration of a control device with respect to time, it is necessary to take a countermeasure such as duplexing a device configuration or the like. Accordingly, in a case in which detection and prevention of unauthorized switching of a control device that is a monitoring target device and detection and prevention of deterioration of the control device with respect to time are performed together using conventional technology, the device configuration becomes complicated, and there is a likelihood that the costs thereof will become high.

An object of the present disclosure is to provide a monitoring device, a monitoring method, and a non-transitory computer-readable medium capable of performing detection and prevention of unauthorized switching of a monitoring target device along with detection and prevention of deterioration of the monitoring target device with respect to time with a simple device configuration and a low cost.

According to an aspect of the present disclosure, there is provided a monitoring device configured to monitor a predetermined monitoring target device including a physically unclonable function (PUF) circuit, the monitoring device including: a PUF information acquiring unit configured to acquire PUF information output from the PUF circuit by inputting a predetermined input value to the PUF circuit; a first PUF information change value calculating unit configured to calculate a degree of change from PUF information acquired at a previous time to PUF information acquired at a current time as a first PUF information change value; a second PUF information change value calculating unit configured to calculate a degree of change from initial PUF information to the PUF information acquired at the current time as a second PUF information change value; an unauthorized use determining unit configured to compare the first PUF information change value with a first threshold and determine that there is unauthorized use of the predetermined monitoring target device in a case in which the first PUF information change value is greater than the first threshold; and a deterioration determining unit configured to compare the second PUF information change value with a second threshold and to determine that the predetermined monitoring target device has deteriorated in a case in which the second PUF information change value is greater than the second threshold.

According to the above-described aspect of the present disclosure, detection of unauthorized switching of a control device that is a monitoring target device and detection of deterioration of the control device with respect to time can be performed together.

DESCRIPTION OF EMBODIMENTS

First Embodiment

Hereinafter, a monitoring system and a monitoring target device according to a first embodiment will be described with reference to FIGS. 1 to 9.

(Entire Configuration of Monitoring System)

Figure 1:
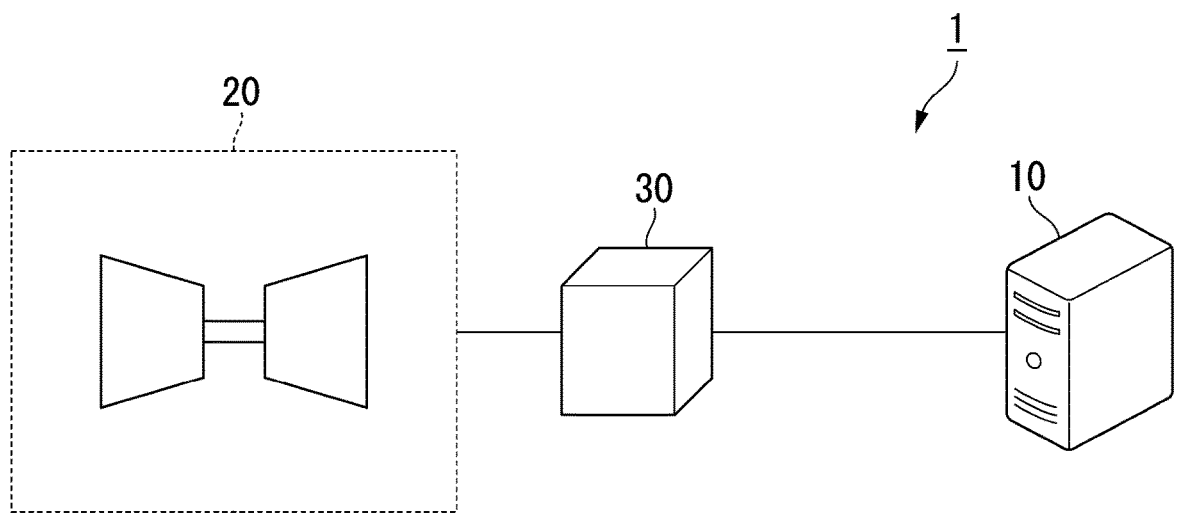
FIG. 1 is a diagram illustrating the entire configuration of a monitoring system according to a first embodiment.

FIG. 1 is a diagram illustrating the entire configuration of a monitoring system according to a first embodiment.

The monitoring system 1 illustrated in FIG. 1 is a system used for monitoring a control device 30 controlling a gas turbine 20 that is a device requiring control (a control target device). More specifically, the monitoring system 1 monitors whether or not the control device 30 has been switched in an unauthorized manner and whether or not the control device 30 deteriorates with respect to time.

As illustrated in FIG. 1, the monitoring system 1 includes a monitoring device 10, the control device 30, and the gas turbine 20. The monitoring device 10 and the control device 30 are communicatively connected through a wide-area communication network (for example, an Internet line or the like). In addition, the control device 30 and the gas turbine 20 are communicatively connected through a dedicated line. In addition, the monitoring device 10 and the control device 30, and the control device 30 and the gas turbine 20 may be communicatively connected through a communication network or a line other than those described above.

The control device 30 is a monitoring target device to be monitored by the monitoring device 10 of the monitoring system 1. Although the monitoring device 10 according to this embodiment, for example, has the control device 30 controlling the gas turbine 20 installed in a power generation plant or the like as its monitoring target, the monitoring device 10 may have a control device 30 controlling a device other than the gas turbine 20 as its monitoring target. For example, the monitoring device 10 may have a control device controlling a steam turbine, a boiler, an intelligent transport system (ITS), a cold heat system (a large refrigerator or an air conditioner), a special vehicle, or the like as its monitoring target. In addition, the monitoring device 10 may have a device other than a control device as its monitoring target.

The control device 30 that is a monitoring target device includes a physically unclonable function (PUF) circuit. Here, the "PUF" is a physical quantity such as a manufacturing variation, a difference between physical characteristics, or the like of an electronic device (a semiconductor chip or the like). The "PUF circuit" is a circuit configured to output a predetermined output value when a predetermined input value is input by using a circuit-specific property (PUF). The PUF circuit, for example, may be an arbiter PUF, a glitch PUF, or the like using a difference in a circuit-specific signal delay.

(Functional Configuration of Monitoring Device)

Figure 2:
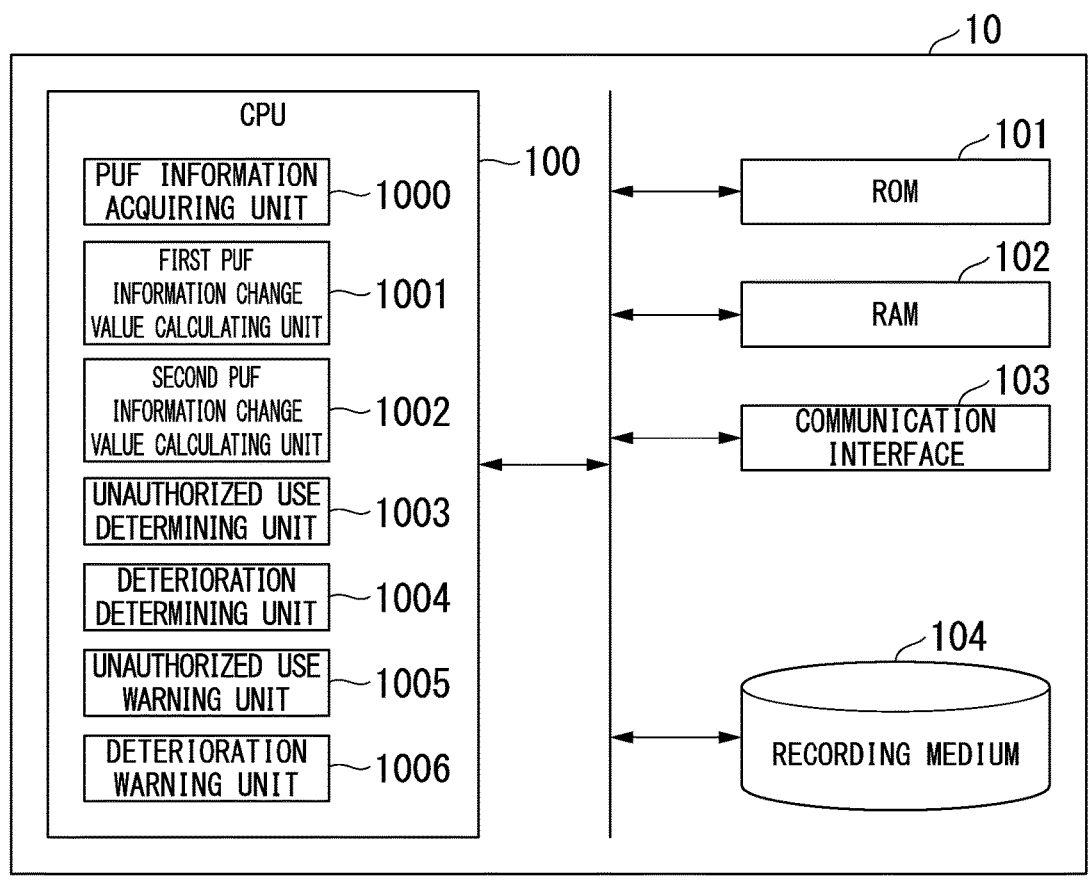
FIG. 2 is a diagram illustrating the functional configuration of a monitoring device according to the first embodiment.

FIG. 2 is a diagram illustrating the functional configuration of the monitoring device 10 according to the first embodiment.

As illustrated in FIG. 2, the monitoring device 10 includes a CPU 100, a ROM 101, a RAM 102, a communication interface 103, and a recording medium 104.

The CPU 100 is a processor that is responsible for the overall operation of the monitoring device 10. The CPU 100 allows various functions to be described later to be exhibited by operating in accordance with a program prepared in advance.

The ROM 101 is a non-rewritable nonvolatile memory. A booting program for starting the monitoring device 10 is recorded in the ROM 101.

The RAM 102 is a rewritable volatile memory. The RAM 102 is also called a main memory device, and a program for causing the CPU 100 to operate such that various functions are exhibited is expanded therein.

The communication interface 103 is an interface used for communicating with the control device 30 that is a monitoring target through a wide-area communication network. In this embodiment, a form of communication (wired or wireless, a global network or a local network, or the like) through the communication interface 103 is not particularly limited.

The recording medium 104 is a large-capacity storage device (nonvolatile memory) built into the monitoring device 10 and, for example, is a hard disk drive (HDD), a solid state drive (SSD), or the like. The recording medium 104 is also referred to as an auxiliary storage device, and acquired PUF information (to be described later) is recorded therein.

The CPU 100, by operating in accordance with a predetermined program, functions as a PUF information acquiring unit 1000, a first PUF information change value calculating unit 1001, a second PUF information change value calculating unit 1002, an unauthorized use determining unit 1003, a deterioration determining unit 1004, an unauthorized use warning unit 1005, and a deterioration warning unit 1006.

The PUF information acquiring unit 1000 inputs a predetermined input value to the PUF circuit 302 to be described later by transmitting the predetermined input value to the monitoring target device 30 (the control device 30) and acquires PUF information corresponding to the predetermined input value from the PUF circuit 302. The "predetermined input value" is an input value used for acquiring a corresponding output value (PUF information) from the PUF circuit 302 and is data of 128 bits set in advance. The "PUF information" is data of 128 bits that corresponds to a predetermined input value and is uniquely output by the PUF circuit 302. In this embodiment, although a predetermined input value and PUF information are data of 128 bits, the predetermined input value and the PUF information, for example, may be data of a number of bits other than 128 bits in accordance with a setting of the PUF circuit 302.

The first PUF information change value calculating unit 1001 calculates a degree of change from PUF information acquired at a previous time by the PUF information acquiring unit 1000 to PUF information acquired at the current time as a first PUF information change value. In this embodiment, the first PUF information change value calculating unit 1001 calculates a degree of difference between PUF information acquired at the previous time by the PUF information acquiring unit 1000 and PUF information acquired at the current time as a first PUF information change value. The "first PUF information change value" and a process of calculating the first PUF information change value calculating unit 1001 will be described later.

The second PUF information change value calculating unit 1002 calculates a degree of change from initial PUF information to PUF information acquired at the previous time by the PUF information acquiring unit 1000 as a second PUF information change value. In this embodiment, the second PUF information change value calculating unit 1002 calculates a degree of difference between PUF information acquired at a first time by the PUF information acquiring unit 1000 (initial PUF information) and PUF information acquired at the current time as a second PUF information change value. The "second PUF information change value" and a process of calculating the second PUF information change value calculating unit 1002 will be described later.

The unauthorized use determining unit 1003 determines whether or not there is unauthorized use in the monitoring target device 30 on the basis of the first PUF information change value calculated by the first PUF information change value calculating unit 1001.

The deterioration determining unit 1004 determines whether or not the monitoring target device 30 has deteriorated on the basis of the second PUF information change value calculated by the second PUF information change value calculating unit 1002.

The unauthorized use warning unit 1005 gives a warning in a case in which there is unauthorized use of the monitoring target device 30 on the basis of a result of the determination acquired by the unauthorized use determining unit 1003. In this embodiment, although the unauthorized use warning unit 1005, for example, gives a warning by transmitting an unauthorized use warning message to a predetermined transmission destination such as a user operating the monitoring device 10, the warning may be given using any other method.

The deterioration warning unit 1006 gives a warning in a case in which it is determined that the monitoring target device 30 has deteriorated on the basis of a result of determination acquired by the deterioration determining unit 1004. In this embodiment, although the deterioration warning unit 1006, for example, gives a warning by transmitting deterioration warning signal to a predetermined transmission destination such as a user operating the monitoring device 10, the warning may be given using any other method.

The communication interface 103 is an interface used for communicating with the monitoring device 10 through a wide-area communication network.

(Functional Configuration of Monitoring Target Device)

Figure 3:
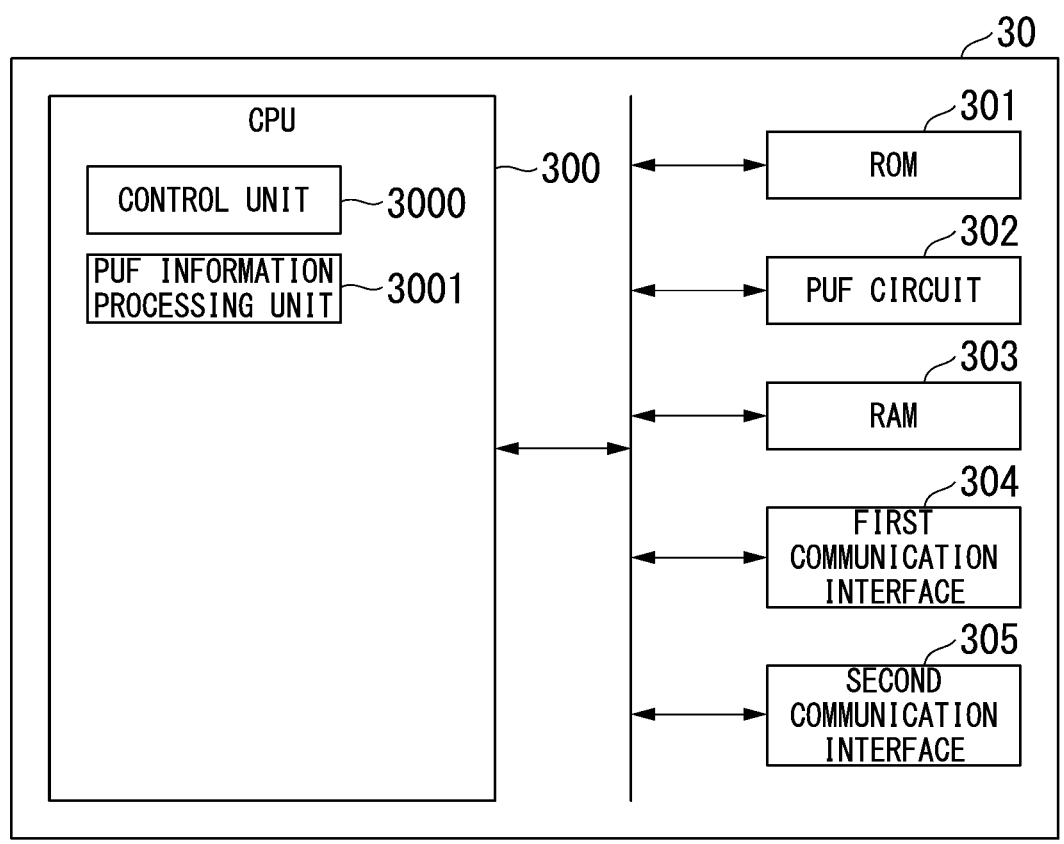
FIG. 3 is a diagram illustrating the functional configuration of a monitoring target device according to the first embodiment.

FIG. 3 is a diagram illustrating the functional configuration of the monitoring target device 30 (the control device 30) according to the first embodiment.

As illustrated in FIG. 3, the monitoring target device 30 includes a CPU 300, a ROM 301, a PUF circuit 302, a RAM 303, a first communication interface 304, and a second communication interface 305.

The CPU 300 is a processor that is responsible for the overall operation of the monitoring target device 30. The CPU 300 operates in accordance with a program prepared in advance, thereby allowing various functions to be described later to be exhibited. The ROM 301 is a non-rewritable nonvolatile memory. A booting program for starting the monitoring target device 30 is recorded in the ROM 301.

The PUF circuit 302 is an integrated circuit that is built in when the monitoring target device 30 is manufactured. When data of 128 bits is input as an input value, the PUF circuit 302 outputs data of 128 bits uniquely corresponding to the input value as an output value (PUF information). An output value output in correspondence with an input value is determined depending on individual physical differences such as a difference in signal delay or the like occurring inside the PUF circuit 302, and accordingly, even when the configurations of logical circuits of the PUF circuit 302 are the same, in a case in which there is a difference in the product (the monitoring target device 30), the same output value cannot be output for the same input value. In this embodiment, although a case in which the PUF circuit 302 is an integrated circuit embedded at the time of manufacturing the monitoring target device 30 will be described, for example, the PUF circuit 302 may be formed in a field programmable gate array (FPGA) that is an integrated circuit capable of forming a desired logic circuit after manufacturing. In addition, the PUF circuit 302 may be designed such that each of an input value and an output value is data of a number of bits other than 128 bits.

The RAM 303 is a rewritable volatile memory. Programs used for causing the CPU 300 to operate such that various functions are exhibited is loaded in the RAM 303.

The first communication interface 304 is an interface used for communicating with the monitoring device 10 through a wide-area communication network.

The second communication interface 305 is an interface used for communicating with the gas turbine 20 that is a control target device through a dedicated line.

The CPU 300 operates in accordance with a program prepared in advance, thereby allowing the functions of a control unit 3000 and a PUF information processing unit 3001 to be exhibited.

The control unit 3000 controls the gas turbine 20. For example, the control unit 3000 controls IO devices (various sensors, an actuator, and the like) mounted in the gas turbine 20. The control unit 3000 may perform other control operations for controlling the gas turbine 20.

The PUF information processing unit 3001 inputs a predetermined input value received from the monitoring device 10 to the PUF circuit 302 and transmits PUF information output from the PUF circuit 302 in correspondence with the predetermined input value to the monitoring device 10.

(Process Flow of Monitoring Device)

Figure 4:
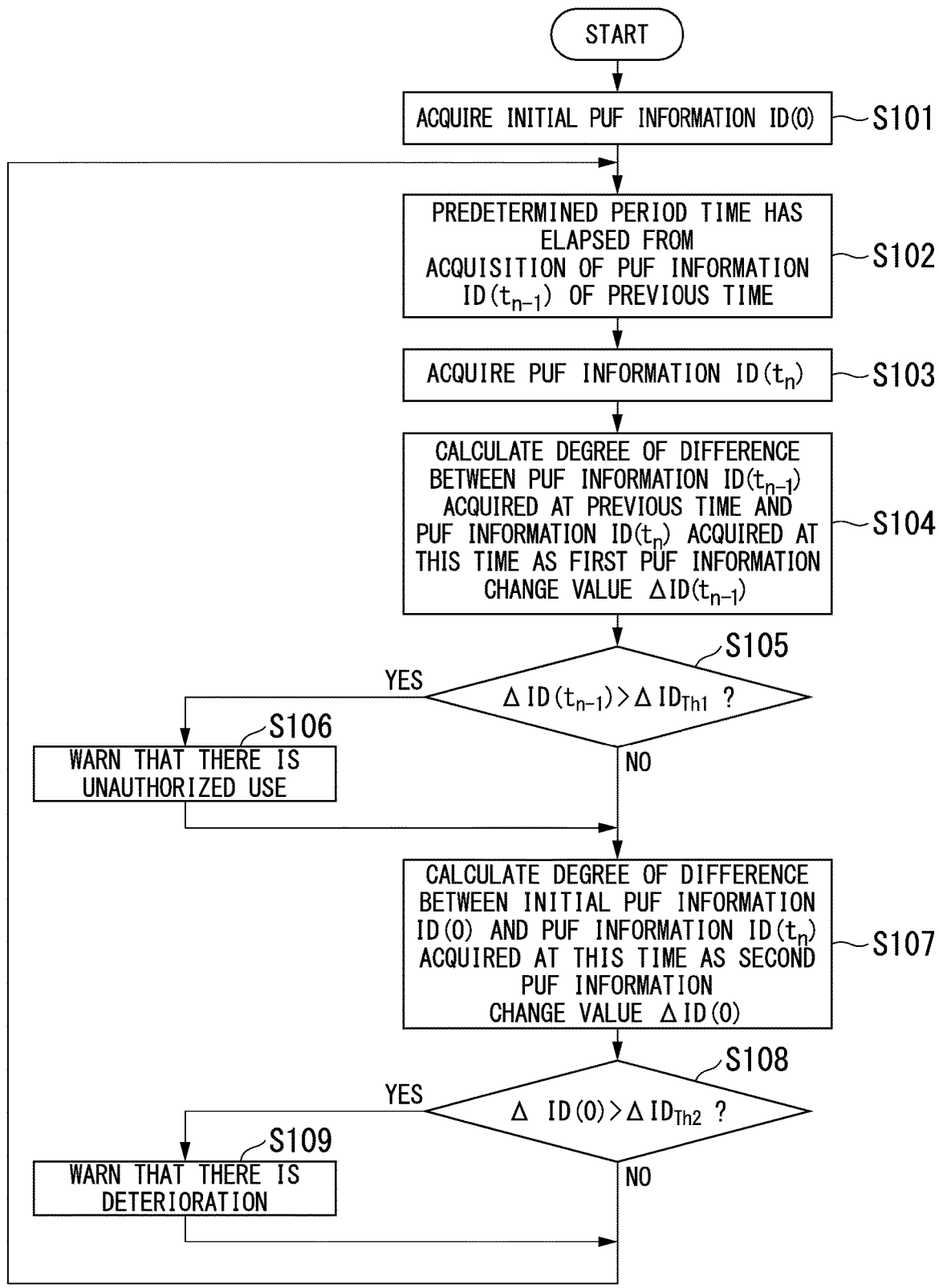
FIG. 4 is a diagram illustrating the process flow of a monitoring device according to the first embodiment.

FIG. 4 is a diagram illustrating the process flow of a monitoring process performed by the monitoring device 10 according to the first embodiment.

The process flow of the monitoring process illustrated in FIG. 4 is started when the operation of the monitoring target device 30 connected to the monitoring device 10 starts (at a time point at which the monitoring target device initially starts to operate).

When the operation of the monitoring target device 30 starts, as illustrated in FIG. 4, the PUF information acquiring unit 1000 of the monitoring device 10 acquires initial PUF information ID(0) (Step S101). In addition, PUF information acquired when a time t (the unit is hours) elapses after starting of a monitoring process will be denoted as ID(t), and the initial PUF information ID that is a PUF information ID at the time of starting the monitoring process (t=0) will be denoted as ID(0).

More specifically, the monitoring device 10 acquires the initial PUF information ID(0) as below. The PUF information acquiring unit 1000 of the monitoring target device 30 transmits data of 128 bits that is a predetermined input value to the PUF circuit 302 of the monitoring target device 30. When the predetermined input value is received from the monitoring device 10, the PUF information processing unit 3001 of the monitoring target device 30 inputs the predetermined input value to the PUF circuit 302. The PUF circuit 302 outputs PUF information (the initial PUF information ID(0)) corresponding to the input predetermined input value. The PUF information processing unit 3001 transmits the initial PUF information ID(0) output from the PUF circuit 302 to the monitoring device 10. Accordingly, the PUF information acquiring unit 1000 acquires the initial PUF information ID(0). The PUF information acquiring unit 1000 stores the acquired initial PUF information ID(0) in the recording medium 104.

In addition, in this embodiment, although a case in which the PUF information acquiring unit 1000 of the monitoring device 10 acquires initial PUF information ID(0) when the operation starts will be described, the initial PUF information ID(0) may be acquired in advance and stored in the recording medium 104. For example, when the monitoring target device 30 is manufactured or the like, PUF information output when a predetermined input value is input to a PUF circuit may be acquired as initial PUF information ID(0) and be stored in the recording medium 104 in advance. In this way, in a case in which the initial PUF information ID(0) is stored in the recording medium 104 in advance, Step S101 described above is omitted.

When a predetermined cycle time has elapsed after the acquisition of PUF information $ID(t_{n-1})$ of the previous time (Step S102), the PUF information acquiring unit 1000 of the monitoring device 10 acquires PUF information $ID(t_n)$ of the current time (Step S103). The PUF information acquiring unit 1000 stores the PUF information $ID(t_n)$ acquired at the current time in the recording medium 104.

Here, n is a natural number, and a time at which the n-th PUF information is acquired after starting of a monitoring process is denoted as $t_n$. Thus, in a case in which the acquisition of PUF information after starting of a monitoring process is the n-th time, which is the current time, the PUF information acquired at the current time is denoted as $ID(t_n)$. In addition, PUF information acquired at an (n−1)-th time, which is the previous time, is denoted as $ID(t_{n-1})$. As illustrated in FIG. 4, while the process of Step S101 described above is a process performed only once after the start of the monitoring process, the processes of Steps S102 to S109 are repeated. Thus, hereinafter, description will be generalized, and a case in which the n-th process is performed will be described.

A "predetermined cycle time" is a time interval at which the monitoring device 10 regularly monitors the monitoring target device 30 regarding unauthorized use and deterioration. In this embodiment, the predetermined cycle time is one hour. However, the "predetermined cycle time," for example, may be any other appropriate value in units of seconds, minutes, days, months, or the like in accordance with operation conditions of the monitoring target device 30 such as a time scale of the operation of the monitoring target device 30 and the like. More specifically, in a case in which the monitoring target device 30 (the control device 30) performs a control operation on the order of seconds, the predetermined cycle time, for example, may be one second. In addition, in a case in which the monitoring target device 30 has a control target device varying on the order of months as its control target, the predetermined cycle time, for example, may be one month. In addition, in this embodiment, although the PUF information acquiring unit 1000 of the monitoring device 10 regularly acquires PUF information ID(t) at a predetermined cycle times, the PUF information acquiring unit 1000 may irregularly acquire PUF information ID(t).

In Step S103, the PUF information acquiring unit 1000 of the monitoring device 10, similar to Step S101, acquires PUF information $ID(t_n)$ of the current time. More specifically, the PUF information acquiring unit 1000 transmits a predetermined input value to the PUF circuit 302 of the monitoring target device 30. When a predetermined input value is received from the monitoring device 10, the PUF information processing unit 3001 of the monitoring target device 30 inputs the received predetermined input value to the PUF circuit 302. The PUF circuit 302 outputs PUF information (PUF information $ID(t_n)$ of the current time) corresponding to the input predetermined input value. The PUF information processing unit 3001 transmits the PUF information $ID(t_n)$ of the current time output from the PUF circuit 302 to the monitoring device 10. Accordingly, the PUF information acquiring unit 1000 acquires the PUF information $ID(t_n)$ of the current time. The PUF information acquiring unit 1000 stores the acquired PUF information $ID(t_n)$ of the current time in the recording medium 104.

Next, the first PUF information change value calculating unit 1001 of the monitoring target device 30 calculates a degree of difference between the PUF information $ID(t_{n-1})$ acquired at the previous time and the PUF information $ID(t_n)$ acquired at the current time as a first PUF information change value $\Delta ID(t_{n-1})$ by referring to the recording medium 104 (Step S104).

The calculation process of the first PUF information change value calculating unit 1001 will be described with reference to FIGS. 5 to 7.

Figure 5:
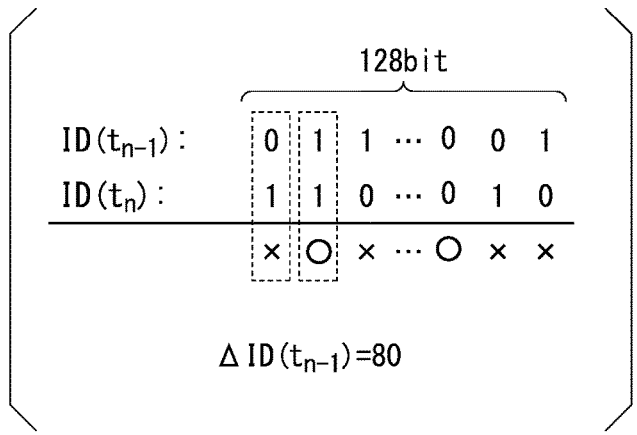
FIG. 5 is an explanatory diagram illustrating the process of a first PUF information change value calculating unit according to the first embodiment.

FIG. 5 is an explanatory diagram illustrating the process of the first PUF information change value calculating unit 1001 according to the first embodiment. FIG. 6 is a first explanatory diagram illustrating PUF information ID(t) acquired by the monitoring device 10 according to the first embodiment. FIG. 6 illustrates an example in which the monitoring target device 30 monitored by the monitoring device 10 is switched unauthorizedly. FIG. 7 is an explanatory diagram illustrating unauthorized switching of the monitoring target device 30 monitored by the monitoring device 10 according to the first embodiment.

As illustrated in FIG. 5, in this embodiment, the first PUF information change value calculating unit 1001 calculates the number of bits different between data of 128 bits configuring the PUF information $ID(t_{n-1})$ acquired at the previous time and data of 128 bits of the PUF information $ID(t_n)$ acquired at the current time as a first PUF information change value $\Delta ID(t_{n-1})$. In the example illustrated in FIG. 5, first-digit bits of the PUF information $ID(t_{n-1})$ and the PUF information ID $(t_n)$ are respectively 0 and 1, which are different from each other, and the difference is represented by the sign X. On the other hand, second-digit bits are the same as "1," and which is represented by a sign O. The first PUF information change value calculating unit 1001 checks differences/coincidences between bits of the PUF information $ID(t_{n-1})$ and the PUF information $ID(t_n)$ for all the digits of 128 bits and calculates a total number of different bits. In the case illustrated in FIG. 5, 80 bits among 128 digit bits are different between the PUF information $ID(t_{n-1})$ acquired at the previous time and the PUF information $ID(t_n)$ acquired at the current time, and accordingly, the first PUF information change value calculating unit 1001 calculates the first PUF information change value $\Delta ID(t_{n-1})$ as being 80. The first PUF information change value calculating unit 1001 inputs the calculated first PUF information change value $\Delta ID(t_{n-1})$ to the unauthorized use determining unit 1003.

The properties of the first PUF information change value $\Delta ID(t_{n-1})$ calculated by the first PUF information change value calculating unit 1001 will be described with reference to FIG. 6.

Figure 6:
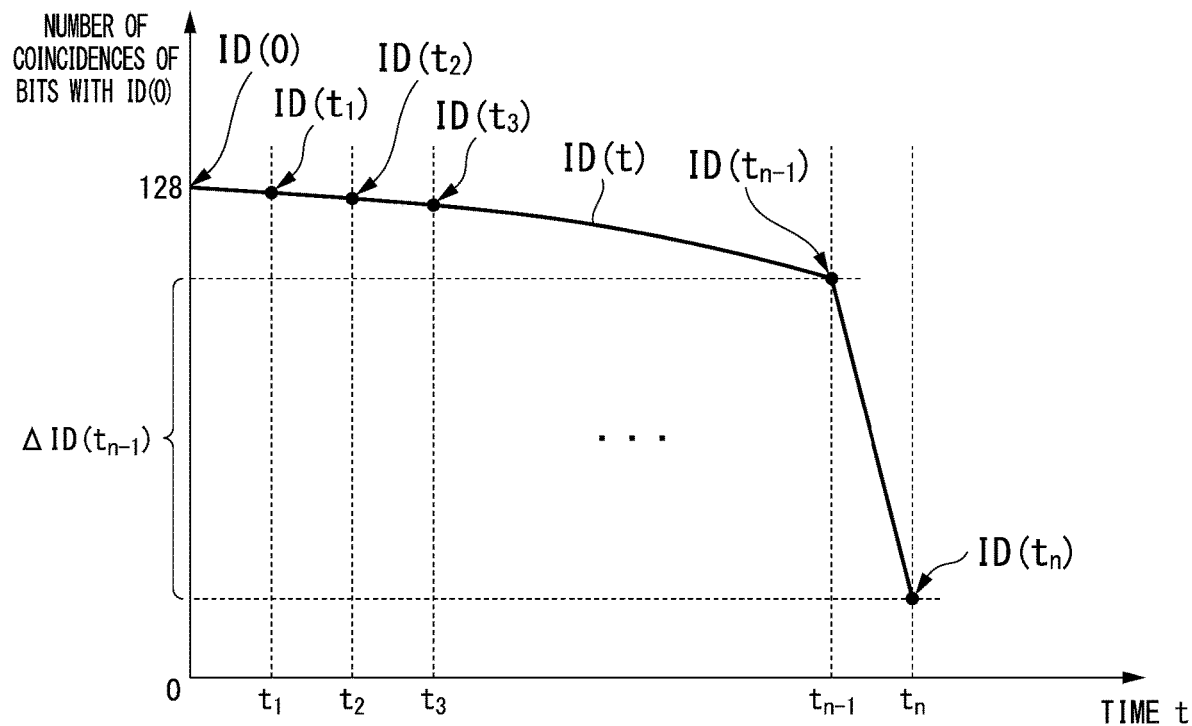
FIG. 6 is a first explanatory diagram illustrating PUF information according to the first embodiment.
Figure 7:
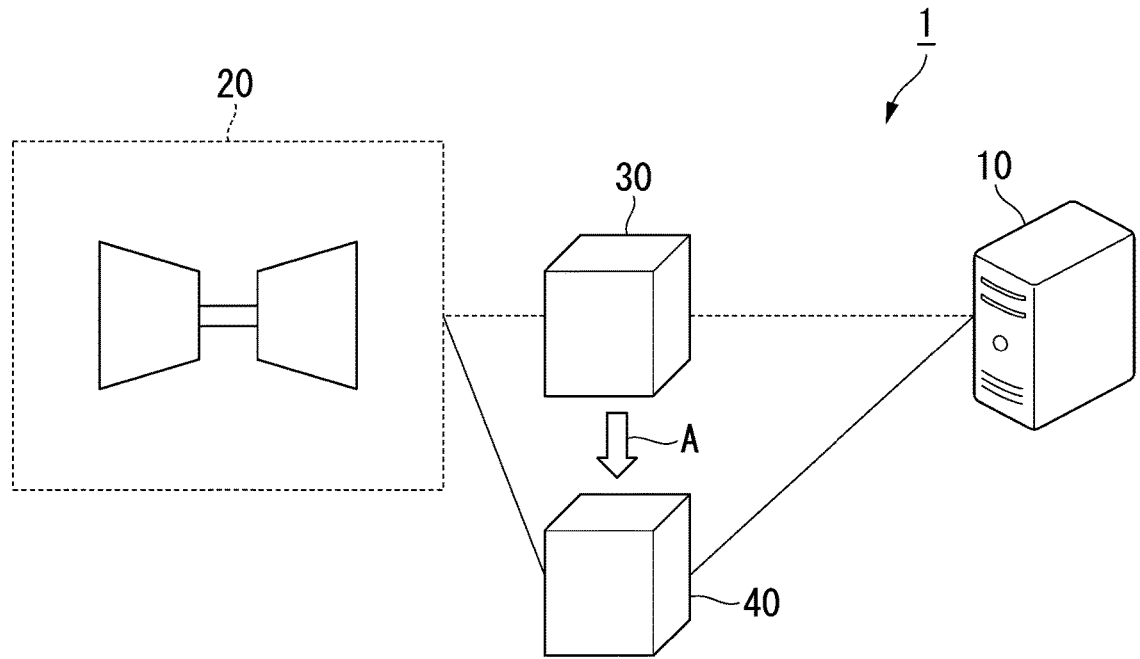
FIG. 7 is an explanatory diagram illustrating unauthorized switching of a monitoring target device monitored by a monitoring device according to the first embodiment.

In FIG. 6, the horizontal axis represents a time t (in units of hours) after starting of a monitoring process. In FIG. 6, PUF information ID(t) output by the PUF circuit 302 after elapse of a time t from the starting of the monitoring process is denoted using a solid line. In FIG. 6, the vertical axis represents the number of coincidences of bits between the PUF information ID(t) and the initial PUF information ID(0). The PUF information ID(t) according to this embodiment is data of 128 bits and is represented in 129 levels from 128 that is the number of coincidences in a case in which the bits completely coincide with each other to the number of coincidences of 0 in a case in which none of the bits is coincident with another. In description presented with reference to FIG. 6, although a case in which the vertical axis represents the "number of coincidences of bits" between the PUF information ID(t) and the initial PUF information ID(0) is shown, by using a "bit coincidence rate" acquired by dividing "the number of coincidences of bits" by the total number of bits "128," the process as described below can also be achieved.

In addition, in FIG. 6, the initial PUF information ID(0) acquired by the PUF information acquiring unit 1000 and PUF information $ID(t_1)$, $ID(t_2)$, $ID(t_3)$, . . . , $ID(t_{n-1})$, and $ID(t_n)$ respectively acquired by the PUF information acquiring unit 1000 at the first time, the second time, the third time, . . . , the (n−1)-th time, and the n-th time (the current time) are illustrated. In addition, times $t_1$, $t_2$, $t_3$, . . . , $t_{n-1}$, and $t_1$ represent elapsed times after starting of a monitoring process. As will be described later, when the time $t_{n-1}$ elapses after starting of a monitoring process, the control device 30 is unauthorizedly switched to a control device 40, and thus, the PUF information ID(t) is not continuous between ID $(t_{n-1})$ and $ID(t_n)$. However, in FIG. 6, in order to represent the PUF information ID(t) as a series of functions, the PUF information $ID(t_{n-1})$ and $ID(t_n)$ are connected using a straight line for the convenience of illustration.

The PUF information ID(t) at the time of starting the monitoring process (t=0) is the initial PUF information ID(0) and naturally completely coincides with the initial PUF information ID(0), and accordingly, a value on the vertical axis (the number of coincidences of bits) is 128. In addition, the PUF information ID(t) is data uniquely output by the PUF circuit 302 in correspondence with a predetermined input value and is theoretically constant. However, actually, the PUF circuit 302 deteriorates with respect to time and, for example, a logic circuit changes due to deformation, degeneration, or the like. For this reason, the PUF information ID(t) output by the PUF circuit 302 in correspondence with a predetermined input value changes in accordance with elapse of time t, and the number of bits not coinciding with those of the initial PUF information ID(0) increases. More specifically, as illustrated in FIG. 6, the PUF information $ID(t_1)$, $ID(t_2)$, $ID(t_3)$, . . . have values on the vertical axis (the number of coincidences of bits) gradually decreasing from 128 in accordance with elapse of time t.

A situation in which the monitoring target device 30 monitored by the monitoring device 10 is unauthorizedly switched will be described with reference to FIG. 7. As illustrated in FIG. 7, a malicious person unauthorizedly rewrites connection destination information on a network relating to a monitoring target device 30 (the control target device 30) when a time $t_{n-1}$ elapses after starting of a monitoring process. Accordingly, as denoted by an arrow A illustrated in FIG. 7, a connection destination of a gas turbine 20 is unauthorizedly switched from the control device 30 to a control device 40, and the gas turbine 20 is unauthorizedly controlled by the control device 40. Similarly, a monitoring target of the monitoring device 10 is unauthorizedly switched from the monitoring target device 30 to a monitoring target device 40.

If a malicious person achieves camouflage, and in a case in which a monitoring target device 40 (the control device 40) after unauthorized switching, similar to a monitoring target device 30 (the control device 30) before switching, has a PUF circuit, PUF information can also be acquired after switching. However, as described above, PUF information output by each PUF circuit is a circuit-specific value, and accordingly, PUF information $ID(t_n)$ output by a PUF circuit after unauthorized switching is different from PUF information $ID(t_{n-1})$ output by a PUF circuit before switching, and thus the PUF information greatly changes as illustrated in FIG. 6. In other words, the PUF information $ID(t_n)$ acquired by the PUF information acquiring unit 1000 has a number of non-coincidences of bits with respect to the initial PUF information ID(0) which is markedly increased from that of the PUF information $ID(t_{n-1})$ acquired at the previous time. Accordingly, as illustrated in FIG. 6, the first PUF information change value $\Delta ID(t_{n-1})$ representing a degree of difference between the PUF information $ID(t_{n-1})$ acquired at the previous time and the PUF information $ID(t_n)$ acquired at the current time, is due to unauthorized switching, therefore the first PUF information change value $\Delta ID(t_{n-1})$ is much larger than, for example, a degree of difference between the PUF information $ID(t_1)$ and the PUF information $ID(t_2)$ due only to deterioration with respect to time or the like.

As illustrated in FIG. 4, the unauthorized use determining unit 1003 compares the first PUF information change value $\Delta ID(t_{n-1})$ input from the first PUF information change value calculating unit 1001 with a first threshold $\Delta ID_{Th1}$ (Step S105) and determines that there is unauthorized use of the monitoring target device 30 in a case in which the first PUF information change value $\Delta ID(t_{n-1})$ is larger than the first threshold $\Delta ID_{Th1}$ (Yes in Step S105). In this case, the process proceeds to Step S106.

Here, "there is unauthorized use" means that the monitoring target device 30 has been unauthorizedly replaced, the monitoring target device 30 has been unauthorizedly switched, or any other unauthorized behavior that can be determined on the basis of the PUF information has been generated.

On the other hand, the unauthorized use determining unit 1003 compares the first PUF information change value $\Delta ID(t_{n-1})$ input from the first PUF information change value calculating unit 1001 with the first threshold $\Delta ID_{Th1}$ (Step S105) and determines that there is no unauthorized use of the monitoring target device 30 in a case in which the first PUF information change value $\Delta ID(t_{n-1})$ is equal to the first threshold $\Delta ID_{Th1}$ or smaller than the first threshold $\Delta ID_{Th1}$ (No in Step S105). In this case, the process proceeds to Step S107.

In this embodiment, since the first threshold $\Delta ID_{Th1}$ is set to 50 in advance, in the case illustrated in FIG. 5, the value "80" of the first PUF information change value $\Delta ID(t_{n-1})$ is larger than the first threshold $\Delta ID_{Th1}$ "50." Accordingly, the unauthorized use determining unit 1003 determines that there is unauthorized use of the monitoring target device 30

(Yes in Step S105) and inputs a result of the determination to the unauthorized use warning unit 1005, and the process proceeds to Step S106.

In addition, the first threshold $\Delta ID_{Th1}$ may be set in advance to an arbitrary value for which it can be determined that there is unauthorized use of the monitoring target device 30 in a case in which the first PUF information change value $\Delta ID(t_{n-1})$ is larger than the first threshold $\Delta ID_{Th1}$.

When the determination of the result is input from the unauthorized use determining unit 1003, the unauthorized use warning unit 1005 gives a warning indicating that there is unauthorized use (Step S106). More specifically, the unauthorized use warning unit 1005 gives a warning, for example, by transmitting an unauthorized use warning message used for notifying a predetermined transmission destination such as a user operating the monitoring device 10 that there is unauthorized use of the monitoring device 10. Next, the process proceeds to Step S107.

Next, the second PUF information change value calculating unit 1002 of the monitoring target device 30 calculates a degree of difference between the initial PUF information ID(0) and the PUF information ID($t_n$) acquired at the current time as a second PUF information change value $\Delta ID(0)$ by referring to the recording medium 104 (Step S107). In this embodiment, the second PUF information change value calculating unit 1002, similar to the sequence of calculating the first PUF information change value $\Delta ID(t_{n-1})$ using the first PUF information change value calculating unit 1001 described above with reference to FIGS. 5 and 6, calculates a PUF information change value $\Delta ID(0)$.

More specifically, in this embodiment, the second PUF information change value calculating unit 1002 calculates the number of bits that are different between data of 128 bits configuring the initial PUF information ID(0) and data of 128 bits of the PUF information ID($t_n$) acquired at the current time as a second PUF information change value $\Delta ID(0)$. The calculation sequence is similar to that of the case described above with reference to FIG. 5. The second PUF information change value calculating unit 1002 inputs the calculated second PUF information change value $\Delta ID(0)$ to the deterioration determining unit 1004.

Figure 8:
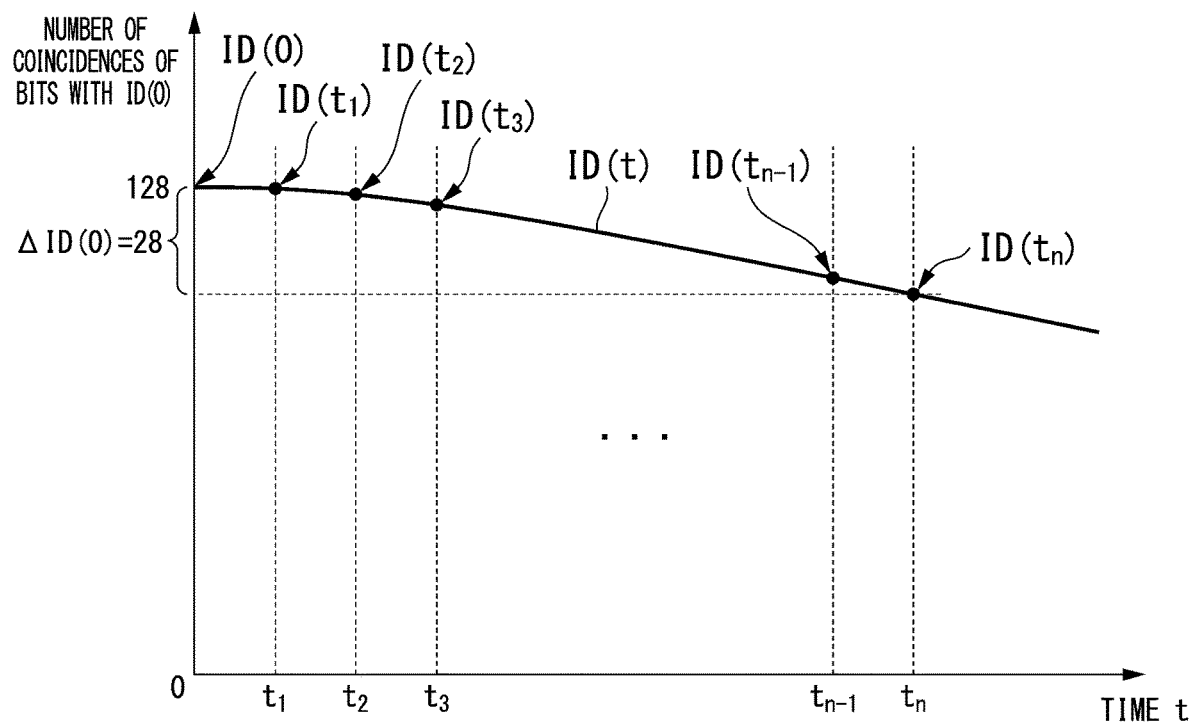
FIG. 8 is a second explanatory diagram illustrating PUF information according to the first embodiment.

Properties of the second PUF information change value $\Delta ID(0)$ calculated by the second PUF information change value calculating unit 1002 will be described with reference to FIG. 8. FIG. 8, similar to FIG. 6, is a second explanatory diagram illustrating PUF information according to the first embodiment. In FIG. 8, the vertical axis and the horizontal axis are defined similarly to FIG. 6, and PUF information ID(t) output by a PUF circuit 302 is denoted by a solid line as a function of a time t. FIG. 8, different from the case illustrated in FIG. 6, illustrates an example in which a monitoring target device 30 monitored by a monitoring device 10 has not been unauthorizedly switched. In FIG. 8, the solid line representing PUF information ID(t) is continuous between PUF information ID($t_{n-1}$) and ID(t).

In this embodiment, a second PUF information change value $\Delta ID(0)$ calculated by the second PUF information change value calculating unit 1002 is a degree of difference between initial PUF information ID(0) and PUF information ID($t_n$) acquired the n-th time. In other words, the second PUF information change value $\Delta ID(0)$ represents a comprehensive change in the PUF information ID(t) from the initial PUF information ID(0) to PUF information ID($t_1$) acquired at the current time.

As illustrated in FIG. 4, the deterioration determining unit 1004 compares the second PUF information change value $\Delta ID(0)$ input from the second PUF information change value calculating unit 1002 with the second threshold $\Delta ID_{Th2}$ (Step S108) and determines that there is deterioration of the monitoring target device 30 in a case in which the second PUF information change value $\Delta ID(0)$ is larger than the second threshold $\Delta ID_{Th2}$ (Yes in Step S108). In this case, the process proceeds to Step S109.

Here, "there is deterioration," for example, means that the monitoring target device 30 has deteriorated with respect to time, the monitoring target device 30 has deteriorated due to the surrounding environment, or there has been any other deterioration that can be determined on the basis of the PUF information.

Meanwhile, the deterioration determining unit 1004 compares the second PUF information change value $\Delta ID(0)$ input from the second PUF information change value calculating unit 1002 with the second threshold $\Delta ID_{Th2}$ (Step S108) and determines that the monitoring target device 30 has not deteriorated in a case in which the second PUF information change value $\Delta ID(0)$ is equal to the second threshold $\Delta ID_{Th2}$ or is smaller than the second threshold $\Delta ID_{Th2}$ (No in Step S108). In this case, as illustrated in FIG. 4, the process returns to Step S102, and the processes of Steps S102 to S109 described above are repeated.

In this embodiment, since the second threshold $\Delta ID_{Th2}$ is set to 20 in advance, in the case illustrated in FIG. 8, a value "28" of the second PUF information change value $\Delta ID(0)$ is larger than the second threshold $\Delta ID_{Th2}$ "20." Accordingly, the deterioration determining unit 1004 determines that there is deterioration of the monitoring target device 30 (Yes in Step S108) and inputs the result of the determination to the deterioration warning unit 1006, and the process proceeds to Step S109.

In addition, the second threshold $\Delta ID_{Th2}$ may be set in advance to an arbitrary value for which it can be determined that there is deterioration of the monitoring target device 30 in a case in which the second PUF information change value $\Delta ID(0)$ is larger than the second threshold $\Delta ID_{Th2}$.

When the result of the determination is input from the deterioration determining unit 1004, the deterioration warning unit 1006 warns that there is deterioration (Step S109). More specifically, the deterioration warning unit 1006, for example, gives a warning by transmitting a deterioration warning message used for notifying a predetermined transmission destination such as a user operating the monitoring device 10 that the monitoring device 10 has deteriorated. Next, the process, as illustrated in FIG. 4, returns to Step S102, and the processes of Steps S102 to S109 described above are repeated.

(Operation and Effects)

As described above, the monitoring device 10 according to the first embodiment is the monitoring device 10 configured to monitor the predetermined monitoring target device 30 including the PUF circuit 302 and includes: the PUF information acquiring unit 1000 configured to acquire PUF information ID(t) output from the PUF circuit 302 by inputting a predetermined input value to the PUF circuit 302; the first PUF information change value calculating unit 1001 configured to calculate a degree of change from the PUF information ID($t_{n-1}$) acquired at the previous time to the PUF information ID($t_n$) acquired at the current time as a first PUF information change value $\Delta ID(t_{n-1})$; the second PUF information change value calculating unit 1002 configured to calculate a degree of change from the initial PUF information ID(0) to the PUF information ID($t_n$) acquired at the current time as a second PUF information change value $\Delta ID(0)$; the unauthorized use determining unit 1003 configured to compare the first PUF information change value $\Delta\mathrm{ID}(t_{n1}\text{-})$ with the first threshold $\Delta\mathrm{ID}_{Th1}$ and determine that there is unauthorized use of the predetermined monitoring target device 30 in a case in which the first PUF information change value $\Delta\mathrm{ID}(t_{n-1})$ is larger than the first threshold $\Delta\mathrm{ID}_{Th1}$; and the deterioration determining unit 1004 configured to compare the second PUF information change value $\Delta\mathrm{ID}(0)$ with the second threshold $\Delta\mathrm{ID}_{Th2}$ and to determine that the predetermined monitoring target device 30 has deteriorated in a case in which the second PUF information change value $\Delta\mathrm{ID}(0)$ is larger than the second threshold $\Delta\mathrm{ID}_{Th2}$.

According to the configuration as described above, unauthorized use determination and deterioration determination for the monitoring target device 30 can be performed together by using PUF information ID(t) output from the PUF circuit 302 included in the predetermined monitoring target device 30. Accordingly, detection and prevention of unauthorized switching of the monitoring target device 30 and detection and prevention of deterioration of the monitoring target device 30 with respect to time can be performed together by using a simple device configuration at a low cost.

In addition, according to the configuration described above, while determination of unauthorized use is performed on the basis of the first PUF information change value $\Delta\mathrm{ID}(t_{n-1})$ representing the degree of change from the PUF information $\mathrm{ID}(t_{n-1})$ acquired at the previous time to the PUF information $\mathrm{ID}(t_n)$ acquired at the current time, determination of deterioration is performed on the basis of the second PUF information change value $\Delta\mathrm{ID}(0)$ representing the degree of change from the initial PUF information ID(0) to the PUF information $\mathrm{ID}(t_n)$ acquired at the current time. Accordingly, determination according to the properties of each of unauthorized use in which changes occur in a short cycle and deterioration in which changes occur in a long cycle can be performed with high accuracy.

Here, the first PUF information change value $\Delta\mathrm{ID}(t_{n-1})$ is the degree of difference between the PUF information $\mathrm{ID}(t_{n-1})$ acquired at the previous time and the PUF information $\mathrm{ID}(t_n)$ acquired at the current time.

By configuring as such, the first PUF information change value $\Delta\mathrm{ID}(t_{n-1})$ can be calculated very easily, and the first PUF information change value calculating unit 1001 can be implemented very easily.

In addition, the second PUF information change value $\Delta\mathrm{ID}(0)$ is a degree of difference between the initial PUF information ID(0) and the PUF information ID $(t_n)$ acquired at the current time.

By configuring as such, the second PUF information change value $\Delta\mathrm{ID}(0)$ can be calculated very easily, and the second PUF information change value calculating unit 1002 can be implemented very easily.

In addition, the monitoring device 10 according to the first embodiment further includes the unauthorized use warning unit 1005 that gives a warning in a case in which there is unauthorized use of a predetermined monitoring target device 30.

By configuring as such, an emergent countermeasure for unauthorized use is urged by warning about a situation in which unauthorized use has occurred, an occurrence of damage according to unauthorized use can be prevented, and expansion of the damage according to negligence of unauthorized use can be prevented.

In addition, the monitoring device 10 according to the first embodiment further includes the deterioration warning unit 1006 that gives a warning in a case in which a predetermined monitoring target device 30 has deteriorated.

By configuring as such, an emergent countermeasure for deterioration is urged by warning about a situation in which the deterioration has occurred, and an occurrence of damage due to the deterioration can be prevented.

Modified Example of First Embodiment

As above, while the monitoring system 1 and the monitoring device 10 according to the first embodiment have been described in detail, specific aspects of the monitoring system 1 and the monitoring device 10 are not limited to those described above, and various design changes and the like can be made within a range not departing from the concept.

First Modified Example of First Embodiment

For example, in the monitoring device 10 according to the first embodiment, it has been described that, when a result of determination is input from the deterioration determining unit 1004, the deterioration warning unit 1006 gives a warning about the presence of deterioration in Step S109 illustrated in FIG. 4.

Here, as a first modified example of the first embodiment, the deterioration warning unit 1006 may give a warning by changing a warning level in a stepped manner in accordance with a degree of change in the second PUF information change value $\Delta\mathrm{ID}(0)$. For example, warning levels may be set such that a first warning level is set in a case in which the second PUF information change value $\Delta\mathrm{ID}(0)$ is in the range of 21 to 40, a second warning level is set in a case in which the second PUF information change value is in the range of 41 to 80, and a third warning level is set in a case in which the second PUF information change value is in the range of 81 to 128

In the example described above, in a case in which the second PUF information change value corresponds to the first warning level, the second warning level, or the third warning level, the second PUF information change value $\Delta\mathrm{ID}(0)$ is larger than a value "20" of the second threshold $\Delta\mathrm{ID}_{Th2}$. However, in a case in which the second PUF information change value corresponds to the first warning level (in a case in which the second PUF information change value $\Delta\mathrm{ID}(0)$ is in the range of 21 to 40), a degree of change (a degree of difference) between the initial PUF information ID(0) and the PUF information $\mathrm{ID}(t_n)$ acquired at the current time is small, and accordingly, a degree of deterioration with respect to time is assumed to be low. Accordingly, in a case in which the second PUF information change value $\Delta\mathrm{ID}(0)$ is in the range of 21 to 40, the deterioration warning unit 1006 gives a warning with the warning level changed to the first warning level by referring to the recording medium 104. In a case in which the warning level is the first warning level, the deterioration warning unit 1006 gives a warning by transmitting a deterioration warning message having a lowest degree of warning to a predetermined transmission destination such as a user operating the monitoring device 10 or the like. As a deterioration warning message having the lowest degree of warning, for example, there is a deterioration warning message notifying that attentive observation of the progress is required since there is a likelihood that the monitoring device 10 has merely deteriorated or the like.

On the other hand, in a case in which the second PUF information change value $\Delta\mathrm{ID}(0)$ is in the range of 81 to 128 by referring to the recording medium 104, the deterioration warning unit 1006 gives a warning with the warning level changed to the third warning level. In a case in which the warning level is the third warning level, the deterioration warning unit 1006 gives a warning by transmitting a deterioration warning message having a highest degree of warning to a predetermined transmission destination such as a user operating the monitoring device 10 or the like. The deterioration warning message having the highest degree of warning may be, for example, a deterioration warning message notifying that immediate replacement is required since there is a likelihood that normal control may not be able to be performed due to deterioration of the monitoring device 10 or the like.

In addition, in a case in which the second PUF information change value $\Delta ID(0)$ is in the range of 41 to 80 by referring to the recording medium 104, the deterioration warning unit 1006 gives a warning with the warning level changed to the second warning level. In a case in which the warning level is the second warning level, the deterioration warning unit 1006 gives a warning by transmitting a deterioration warning message having a second highest degree of warning to a predetermined transmission destination such as a user operating the monitoring device 10 or the like. The deterioration warning message having the second-highest degree of warning may be, for example, a deterioration warning message notifying that a countermeasure is required as necessary after checking since the monitoring device 10 has deteriorated or the like.

In this way, since a user performing monitoring using the monitoring device 10 is warned in a stepwise warning level, the warning can be immediately responded in a case in which the degree of emergency is high (the warning level is high), and, the warning can be responded with a spare time in a case in which the degree of emergency is low (the warning level is low). Accordingly, a warning can be appropriately responded in accordance with the warning level, whereby time and operation efficiency is improved.

In addition, in the example described above, although a case in which the deterioration warning unit 1006 gives a warning using a deterioration warning message has been described, for example, a warning may be given using a warning sound. In such a case, the deterioration warning unit 1006, for example, may give a warning by changing a warning level in a stepped manner by changing the type of warning sound.

Second Modified Example of First Embodiment

In addition, for example, in the monitoring device 10 according to the first embodiment, in Step S104 illustrated in FIG. 4, the first PUF information change value calculating unit 1001 has been described to calculate a first PUF information change value as a degree $\Delta ID(t_{n-1})$ of difference between the PUF information $ID(t_{n-1})$ acquired at the previous time and the PUF information $ID(t_n)$ acquired at the current time.

Here, as a second modified example of the first embodiment, a first PUF information change value calculated by the first PUF information change value calculating unit 1001 may be a rate of change of the PUF information ID(t) with respect to time from the PUF information $ID(t_{n-1})$ acquired at the previous time to the PUF information $ID(t_n)$ acquired at the current time.

More specifically, a rate of change of the PUF information ID(t) with respect to time from the PUF information $ID(t_{n-1})$ acquired at the previous time to the PUF information $ID(t_n)$ acquired at the current time (a first PUF information change value) may be $\Delta ID(t_{n-1})/(t_n-t_{n-1})$ that is acquired by dividing a degree $\Delta ID(t_{n-1})$ of difference between the PUF information $ID(t_{n-1})$ acquired at the previous time and the PUF information $ID(t_n)$ acquired at the current time by an elapsed time $(t_n-t_{n-1})$. Alternatively, a rate of change of the PUF information ID(t) with respect to time from the PUF information $ID(t_{n-1})$ acquired at the previous time to the PUF information ID(t) acquired at the current time (a first PUF information change value) may be a derivative $dID(t_{n-1})/dt$ of the PUF information ID(t) at the time $t_{n-1}$. In addition, in this case, the PUF information ID(t) may acquire a derivative $dID(t_{n-1})/dt$ from an approximation curve after acquiring the approximation curve passing through PUF information $ID(t_1)$, $ID(t_2)$, $ID(t_3)$, . . . , $ID(t_{n-1})$, and $ID(t_n)$ respectively acquired at the first time, the second time, the third time, . . . , the (n−1)-th time, and the n-th time (the current time) by the PUF information acquiring unit 1000.

In an unauthorized use determining unit 1003 according to the second modified example of the first embodiment, a first threshold $\Delta ID_{Th1}$ used for determination of unauthorized use in Step S105 illustrated in FIG. 4 is set to a value corresponding to a first PUF information change value $\Delta ID(t_{n-1})/(t_n-t_{n-1})$ that is a rate of change of the PUF information ID(t) with respect to time or the like.

In this way, the unauthorized use determining unit 1003 of the monitoring device 10 can determine whether or not there is unauthorized use of the monitoring target device 30 in accordance with a rate of change of the PUF information ID(t) with respect to time and accordingly can determine that there is unauthorized use of the monitoring target device 30 at a stage at which the PUF information ID(t) starts to sharply change. In addition, the unauthorized use determining unit 1003 of the monitoring device 10 can determine whether or not there is unauthorized use of the monitoring target device 30 by distinguishing between a case in which the PUF information ID(t) sharply changes and a case in which the PUF information ID(t) gently changes. In this way, the monitoring device 10 can appropriately determine unauthorized use of the monitoring target device 30.

Third Modified Example of First Embodiment

In addition, for example, in the monitoring device 10 according to the first embodiment, the second PUF information change value calculating unit 1002 has been described to calculate a second PUF information change value as a degree $\Delta ID(0)$ of difference between the initial PUF information ID(0) and the PUF information $ID(t_n)$ acquired at the current time in Step S107 illustrated in FIG. 4.

Here, as a third modified example of the first embodiment, a second PUF information change value calculated by the second PUF information change value calculating unit 1002 may be a rate of change of the PUF information ID(t) with respect to time from the initial PUF information ID(0) to the PUF information $ID(t_n)$ acquired at the current time.

More specifically, a rate of change of the PUF information ID(t) with respect to time from the initial PUF information ID(0) to the PUF information $ID(t_n)$ acquired at the current time (a second PUF information change value) may be $\Delta ID(0)/t_n$ that is acquired by dividing a degree $\Delta ID(0)$ of difference between the initial PUF information ID(0) and the PUF information $ID(t_n)$ acquired at the current time by an elapsed time $(t_n-0)$. Alternatively, a rate of change of the PUF information ID(t) with respect to time from the initial PUF information ID(0) to the PUF information $ID(t_n)$ acquired at the current time (a second PUF information change value) may be a derivative $dID(t_n)/dt$ of the PUF information ID(t) at the time $t_n$. In addition, in this case, the PUF information ID(t) may acquire a derivative $dID(t_n)/dt$ from an approximation curve after acquiring the approximation curve passing through PUF information $ID(t_1)$, $ID(t_2)$, $ID(t_3)$, . . . , $ID(t_{n-1})$, and $ID(t_n)$ respectively acquired at the first time, the second time, the third time, . . . , the (n−1)-th time, and the n-th time (the current time) by the PUF information acquiring unit 1000.

In a deterioration determining unit 1004 according to a third modified example of the first embodiment, a second threshold $\Delta ID_{Th2}$ used for determination of deterioration in Step S108 illustrated in FIG. 4 is set to a value corresponding to a second PUF information change value $\Delta ID(0)/t_n$ that is a rate of change of the PUF information ID(t) with respect to time or the like.

In this way, the deterioration determining unit 1004 of the monitoring device 10 can determine whether or not the monitoring target device 30 has deteriorated in accordance with a rate of change of the PUF information ID(t) with respect to time and accordingly can determine that there is deterioration of the monitoring target device 30 at a stage at which the PUF information ID(t) starts to sharply change. In addition, the deterioration determining unit 1004 of the monitoring device 10 can determine whether or not the monitoring target device 30 has deteriorated by differentiating a case in which the PUF information ID(t) sharply changes and a case in which the PUF information ID(t) gently changes. In this way, the monitoring device 10 can appropriately determine deterioration of the monitoring target device 30.

Second Embodiment

Next, a monitoring system and a monitoring target device according to a second embodiment will be described with reference to FIGS. 9 to 12.

(Device Configuration of Monitoring Target Device)

Figure 9:
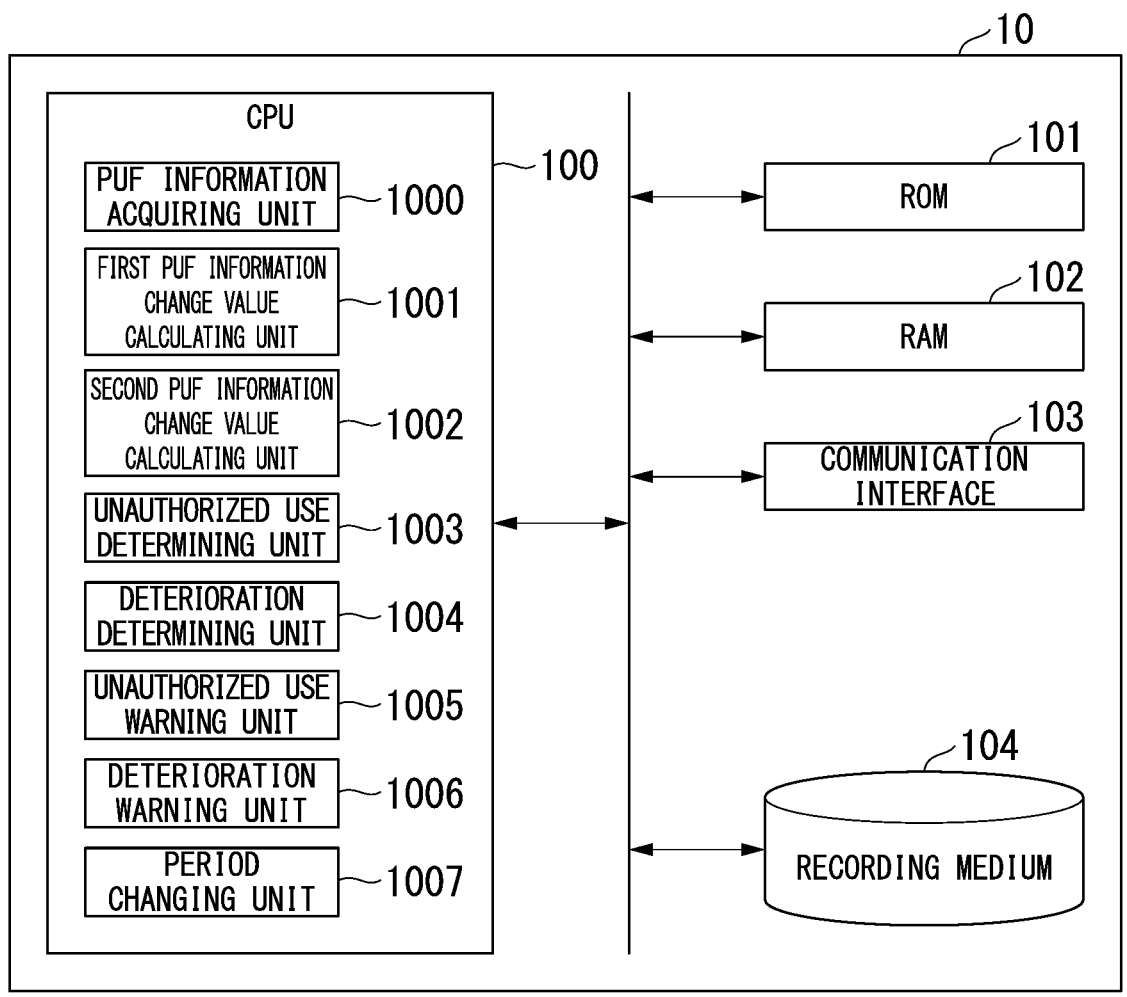
FIG. 9 is a diagram illustrating the functional configuration of a monitoring device according to a second embodiment.

FIG. 9 is a diagram illustrating the functional configuration of a monitoring device 10 according to a second embodiment.

As illustrated in FIG. 9, a CPU 100 of the monitoring device 10 according to the second embodiment allows the function of a cycle changing unit 1007 to be exhibited in addition to those according to the first embodiment. Accordingly, unless otherwise mentioned, respective constituent elements other than the cycle changing unit 1007 included in the monitoring device 10 according to the second embodiment functions similar to those of respective constituent elements of the monitoring device 10 according to the first embodiment.

The cycle changing unit 1007 changes a predetermined cycle time to decrease in a case in which the acquired rate of change of the PUF information ID(t) with respect to time, which is acquired by the PUF information acquiring unit 1000, has an increasing trend and changes the predetermined cycle time such that is increases in a case in which the acquired rate of change of the PUF information ID(t) with respect to time, which is acquired by the PUF information acquiring unit 1000, has a decreasing trend.

(Process Flow of Monitoring Device)

Figure 10:
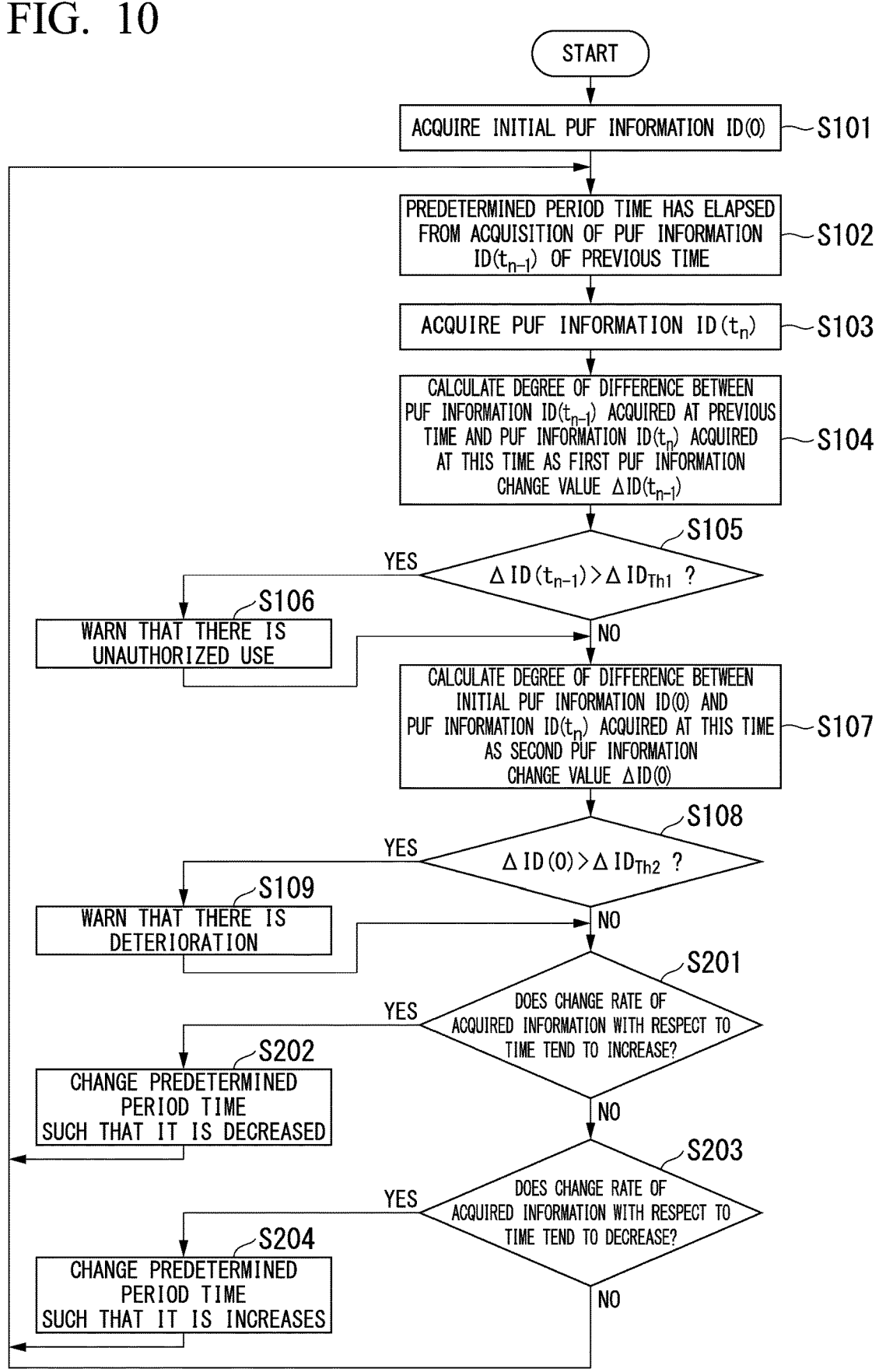
FIG. 10 is a diagram illustrating the process flow of a monitoring device according to the second embodiment.

FIG. 10 is a diagram illustrating the process flow of the monitoring device 10 according to the second embodiment.

Steps S201 to S204 are further added in the process flow of the monitoring device 10 according to the second embodiment illustrated in FIG. 10, which is different from the process flow of the monitoring device 10 according to the first embodiment illustrated in FIG. 4. In the monitoring device 10 according to the second embodiment, processes other than those of Steps S201 to S204 are similar to the processes of the monitoring device 10 according to the first embodiment, and thus, hereinafter, different processes will be described.

As illustrated in FIG. 10, after the process of Step S108 or S109, the process of Step S201 is performed. In other words, the cycle changing unit 1007 of the monitoring device 10 determines whether or not a rate of change of the PUF information ID(t) with respect to time acquired by the PUF information acquiring unit 1000 has an increasing trend (Step S201).

Figure 11:
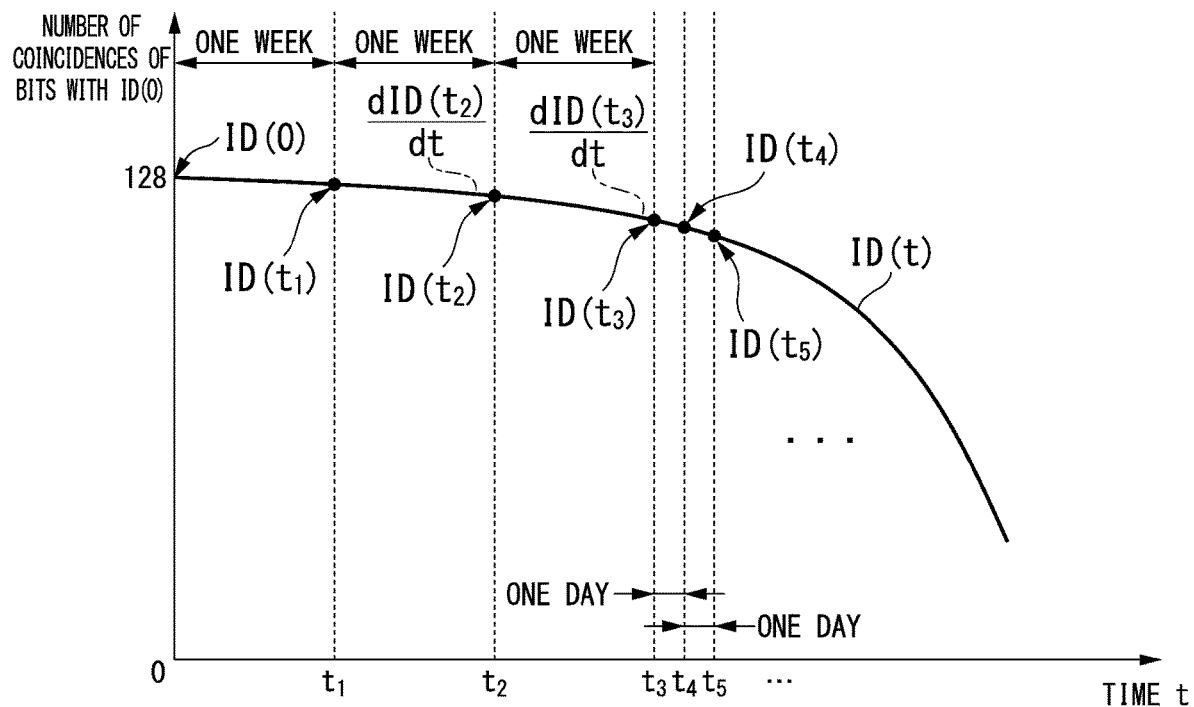
FIG. 11 is a first explanatory diagram illustrating a cycle changing process of a monitoring device according to the second embodiment.
Figure 12:
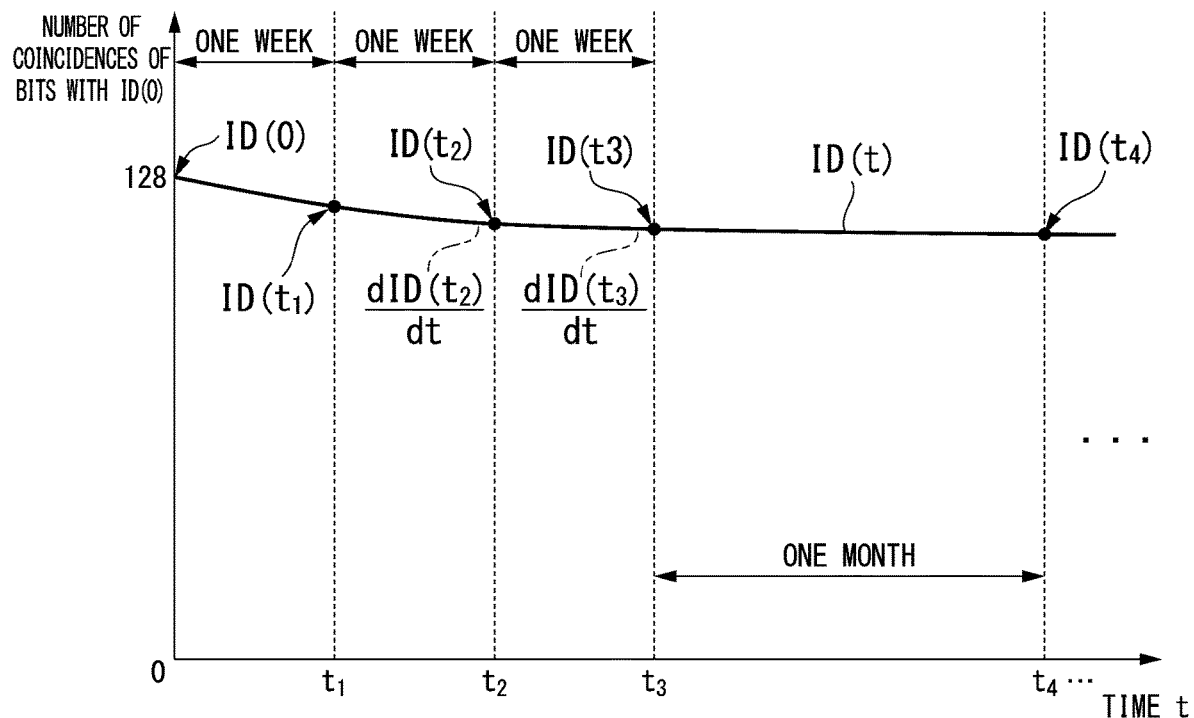
FIG. 12 is a second explanatory diagram illustrating a cycle changing process of a monitoring device according to the second embodiment.

A specific sequence of the process of Step S201 will be described with reference to FIGS. 11 and 12. FIGS. 11 and 12 are first and second explanatory diagrams illustrating cycle changing processes of the monitoring device 10 according to the second embodiment. In FIGS. 11 and 12, the vertical axis and the horizontal axis are defined similar to FIG. 6, and PUF information ID(t) output by the PUF circuit 302 is denoted by a solid line as a function of a time t. In the cases illustrated in FIGS. 11 and 12, it is assumed that one week is set as a predetermined cycle time in the PUF information acquiring unit 1000. In addition, it is assumed that PUF information ID(t) acquired at the current time by the PUF information acquiring unit 1000 is $ID(t_3)$. Accordingly, the PUF information acquiring unit 1000 regularly acquires PUF information $ID(t_1)$, $ID(t_2)$, and $ID(t_3)$ each time when one week elapses.

In Step S201, the cycle changing unit 1007 acquires initial PUF information $ID(0)$, PUF information $ID(t_3)$ acquired at the current time by the PUF information acquiring unit 1000, PUF information $ID(t_2)$ acquired at the previous time, and PUF information $ID(t_1)$ acquired at a time previous to the previous time by referring to the recording medium 104. Next, the cycle changing unit 1007 calculates an approximation curve passing through the PUF information $ID(0)$, the PUF information $ID(t_1)$, the PUF information $ID(t_2)$, and the PUF information $ID(t_3)$ that have been acquired. The cycle changing unit 1007 calculates a derivative $dID(t_2)/dt$ at a time $t_2$ for the calculated approximation curve and sets an absolute value thereof as "a rate of change of the PUF information $ID(t_2)$ of the previous time with respect to time". Similarly, the cycle changing unit 1007 calculates a derivative $dID(t_3)/dt$ at a time $t_3$ for the calculated approximation curve and sets an absolute value thereof as "a rate of change of the PUF information $ID(t_3)$ of the current time with respect to time".

The cycle changing unit 1007 compares "the rate of change of the PUF information $ID(t_2)$ of the previous time with respect to time" that has been calculated with "the rate of change of the PUF information $ID(t_3)$ of the current time with respect to time" and determines that the rate of change of the PUF information ID(t) with respect to time acquired by the PUF information acquiring unit 1000 has an increasing trend in a case in which "the rate of change of the PUF information $ID(t_3)$ of the current time with respect to time" is higher than "the rate of change of the PUF information $ID(t_2)$ of the previous time with respect to time" (Yes in Step S201). On the other hand, in a case in which "the rate of change of the PUF information $ID(t_3)$ of the current time with respect to time" is equal to or lower than "the rate of change of the PUF information $ID(t_2)$ of the previous time with respect to time," the process proceeds to the next Step S203 (No in Step S201).

In the case illustrated in FIG. 11, since a slope (an absolute value of a derivative) of the PUF information ID(t) at the time $t_3$ is higher than a slope (an absolute value of a derivative) at the time $t_2$, it is determined that a rate of change of the PUF information ID(t) with respect to time acquired by the PUF information acquiring unit 1000 has an increasing trend (Yes in Step S201), and the process proceeds to the next Step S203.

The cycle changing unit 1007 changes the predetermined cycle time to decrease (Step S202). For example, in the case illustrated in FIG. 11, the cycle changing unit 1007 changes the predetermined cycle time from one week to one day such that the predetermined cycle time decreases. Accordingly, in the case illustrated in FIG. 11, after the time $t_3$, the PUF information acquiring unit 1000 regularly acquires PUF information ID($t_4$), ID($t_5$), . . . each time one day elapses. As illustrated in FIG. 10, after Step S202, the process returns to Step S102.

In Step S203, the cycle changing unit 1007 compares "the rate of change of the PUF information ID($t_2$) of the previous time with respect to time" calculated in Step S201 with "the rate of change of the PUF information ID($t_3$) of the current time with respect to time" and determines that the rate of change of the PUF information ID(t) with respect to time acquired by the PUF information acquiring unit 1000 has a decreasing trend (Yes in Step S203) in a case in which "the rate of change of the PUF information ID($t_3$) of the current time with respect to time" is lower than "the rate of change of the PUF information ID($t_2$) of the previous time with respect time" (Yes in Step S203). On the other hand, in a case in which "the rate of change of the PUF information ID($t_3$) of the current time with respect to time" is equal to or higher than "the rate of change of the PUF information ID($t_2$) of the previous time with respect to time," the process returns to Step S102 (No in Step S203).

In the case illustrated in FIG. 12, since the slope (an absolute value of a derivative) of the PUF information ID(t) at the time $t_3$ is lower than the slope (an absolute value of a derivative) at the time $t_2$, it is determined that a rate of change of the PUF information ID(t) with respect to time acquired by the PUF information acquiring unit 1000 has a decreasing trend (Yes in Step S203), the process proceeds to the next Step S204.

The cycle changing unit 1007 changes the predetermined cycle time to increase (Step S204). For example, in the case illustrated in FIG. 12, the cycle changing unit 1007 changes the predetermined cycle time from one week to one month such that the predetermined cycle time increases. Accordingly, in the case illustrated in FIG. 12, after the time $t_3$, the PUF information acquiring unit 1000 regularly acquires PUF information ID($t_4$), . . . each time when one month elapses. As illustrated in FIG. 10, after Step S204, the process returns to Step S102.

In addition, in the description presented above, although a case in which a derivative is calculated from an approximation curve after the cycle changing unit 1007 calculates the approximation curve when "the rate of change of the PUF information ID($t_2$) of the previous time with respect to time" and "the rate of change of the PUF information ID($t_3$) of the current time with respect to time" are calculated has been described, the cycle changing unit 1007, for example, may acquire $\Delta\text{ID}(t_2)/(t_2-t_1)$ acquired by dividing a degree $\Delta\text{ID}(t_2)$ of difference between the PUF information ID($t_1$) acquired at a time previous to the previous time and the PUF information ID($t_2$) acquired at the previous time by an elapsed time $(t_2-t_1)$ as a rate of change of the PUF information ID($t_2$) of the previous time with respect to time. Similarly, the cycle changing unit 1007 may acquire $\Delta\text{ID}(t_3)/(t_3-t_2)$ acquired by dividing a degree $\Delta\text{ID}(t_3)$ of difference between the PUF information ID($t_2$) acquired at the previous time and the PUF information ID($t_3$) acquired at the current time by an elapsed time $(t_3-t_2)$ as a rate of change of the PUF information ID($t_3$) of the current time with respect to time.

(Operation and Effect)

As described above, the monitoring device 10 according to the second embodiment further includes the cycle changing unit 1007 configured to change the predetermined cycle time to decrease in a case in which the rate of change of the acquired PUF information ID(t) with respect to time has a decreasing trend and changes the predetermined cycle time to increase in a case in which the rate of change of the acquired PUF information ID(t) with respect to time has a decreasing trend.

According to the aspect as described above, for example, as illustrated in FIG. 11, in a case in which the rate of change of acquired PUF information ID(t) with respect to time has an increasing trend such as a case in which the deterioration of the monitoring target device 30 sharply has progressed or the like, a predetermined cycle time in which PUF information ID(t) is acquired by the PUF information acquiring unit 1000 is changed to decrease, and the monitoring of the monitoring target device 30 can be appropriately reinforced. To the contrary, for example, as illustrated in FIG. 12, in a case in which a rate of change of the acquired PUF information ID(t) with respect to time has a decreasing trend such as a case in which deterioration of the monitoring target device 30 settles down or the like, a predetermined cycle time at which PUF information ID(t) is acquired by the PUF information acquiring unit 1000 is changed to increase, and the processing load and the processing cost of the monitoring process performed by the monitoring target device 30 are reduced, and thus cost-effectiveness can be improved.

In addition, in the second embodiment, although a case in which the cycle changing unit 1007 changes the predetermined cycle time to decrease in a case in which a rate of change of the acquired PUF information ID(t) with respect to time has an increasing trend and changes the predetermined cycle time to increase in a case in which the rate of change of the acquired PUF information ID(t) with respect to time has a decreasing trend has been described, the cycle changing unit 1007 may be configured to change any one thereof only. In other words, the cycle changing unit 1007 may be configured to change the predetermined cycle time to decrease in a case in which a rate of change of the acquired PUF information ID(t) with respect to time has an increasing trend or may be configured to change the predetermined cycle time to increase in a case in which the rate of change of the acquired PUF information ID(t) with respect to time has a decreasing trend. In such a case, the effects described above (appropriate reinforcement of monitoring, improvement of cost-effectiveness according to reduction of the processing load and the processing cost of the monitoring process) are acquired in accordance with an implemented configuration.

In addition, in each embodiment described above, the procedure of various processes of the monitoring device 10 described above is stored on a computer-readable recording medium in the form of a program, and, by reading and executing the program using a computer, the various processes described above are executed. Here, the computer-readable recording medium is a magnetic disk, a magneto-optical disk, a CD-ROM, a DVD-ROM, a semiconductor memory, or the like. In addition, this computer program may be delivered to a computer through a communication line, and the computer that has received the computer program may execute the program.

The program may be used for realizing a part of the function described above. Furthermore, the program may be a program that can realize the function described above in combination with a program that already has been recorded in a computer system, a so-called differential file (differential program).

In addition, in another embodiment, some of the functions included in the monitoring device 10 described in the first and second embodiments (and modified examples thereof) may be configured to be included in another computer connected through a network.

In addition, according to a second aspect of the present disclosure, the first PUF information change value is a degree of difference between the PUF information acquired at the previous time and the PUF information acquired at the current time.

Furthermore, according to a third aspect of the present disclosure, the first PUF information change value is a rate of change of PUF information with respect to time from the PUF information acquired at the previous time to the PUF information acquired at the current time.

In addition, according to a fourth aspect of the present disclosure, the second PUF information change value is a degree of difference between the initial PUF information and the PUF information acquired at the current time.

Furthermore, according to a fifth aspect of the present disclosure, the second PUF information change value is a rate of change of PUF information with respect to time from the initial PUF information to the PUF information acquired at the current time.

In addition, according to a sixth aspect of the present disclosure, an unauthorized use warning unit configured to give a warning in a case in which there is unauthorized use of the predetermined monitoring target device is further included.

Furthermore, according to a seventh aspect of the present disclosure, a deterioration warning unit configured to give a warning in a case in which the predetermined monitoring target device has deteriorated is further included.

In addition, according to an eighth aspect of the present disclosure, the deterioration warning unit is configured to give a warning with a warning level changed in a stepped manner in accordance with the degree of change in the second PUF information change value.

Furthermore, according to a ninth aspect of the present disclosure, the PUF information acquiring unit is configured to regularly acquire the PUF information at a predetermined cycle time.

In addition, according to a tenth aspect of the present disclosure, a cycle changing unit configured to change the predetermined cycle time such that it decreases in a case in which the rate of change of the acquired PUF information with respect to time has an increasing trend or change the predetermined cycle time to increase in a case in which the rate of change of the acquired PUF information with respect to time has a decreasing trend is further included.

Furthermore, according to an eleventh aspect of the present disclosure, a monitoring method is a monitoring method for monitoring a predetermined monitoring target device including a physically unclonable function (PUF) circuit, the monitoring method including: acquiring PUF information output from the PUF circuit by inputting a predetermined input value to the PUF circuit; calculating a degree of change from PUF information acquired at a previous time to PUF information acquired at the current time as a first PUF information change value; calculating a degree of change from initial PUF information to the PUF information acquired at the current time as a second PUF information change value; comparing the first PUF information change value with a first threshold and determining that there is unauthorized use of the predetermined monitoring target device in a case in which the first PUF information change value is greater than the first threshold; and comparing the second PUF information change value with a second threshold and determining that the predetermined monitoring target device has deteriorated in a case in which the second PUF information change value is greater than the second threshold.

In addition, according to a twelfth aspect of the present disclosure, there is provided a non-transitory computer-readable recording medium having a program recorded thereon, the program causing a monitoring device monitoring a predetermined monitoring target device including a physically unclonable function (PUF) circuit to function as: a PUF information acquiring unit configured to acquire PUF information output from the PUF circuit by inputting a predetermined input value to the PUF circuit; a first PUF information change value calculating unit configured to calculate a degree of change from PUF information acquired at a previous time to PUF information acquired at the current time as a first PUF information change value; a second PUF information change value calculating unit configured to calculate a degree of change from initial PUF information to the PUF information acquired at the current time as a second PUF information change value; an unauthorized use determining unit configured to compare the first PUF information change value with a first threshold and determine that there is unauthorized use of the predetermined monitoring target device in a case in which the first PUF information change value is greater than the first threshold; and a deterioration determining unit configured to compare the second PUF information change value with a second threshold and to determine that the predetermined monitoring target device has deteriorated in a case in which the second PUF information change value is greater than the second threshold.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Monitoring system
10 Monitoring device
20 Gas turbine
30 Control device (monitoring target device)
40 Control device (monitoring target device)
1000 PUF information acquiring unit
1001 First PUF information change value calculating unit
1002 Second PUF information change value calculating unit
1003 Unauthorized use determining unit
1004 Deterioration determining unit
1005 Unauthorized use warning unit
1006 Deterioration warning unit
1007 Cycle changing unit
100 CPU
101 ROM
102 RAM 103 Communication interface
104 Recording medium
300 CPU
301 ROM
302 PUF circuit
303 RAM
304 First communication interface
305 Second communication interface

The invention claimed is:

1. A monitoring device configured to monitor a predetermined monitoring target device including a physically unclonable function (PUF) circuit, the monitoring device comprising:
   a PUF information acquiring unit configured to acquire PUF information output from the PUF circuit by inputting a predetermined input value to the PUF circuit;
   a first PUF information change value calculating unit configured to calculate a degree of change from PUF information acquired at a previous time to PUF information acquired at a current time as a first PUF information change value;
   a second PUF information change value calculating unit configured to calculate a degree of change from initial PUF information to the PUF information acquired at the current time as a second PUF information change value;
   an unauthorized use determining unit configured to compare the first PUF information change value with a first threshold and determine that there is unauthorized use of the predetermined monitoring target device in a case in which the first PUF information change value is greater than the first threshold; and
   a deterioration determining unit configured to compare the second PUF information change value with a second threshold and to determine that the predetermined monitoring target device has deteriorated in a case in which the second PUF information change value is greater than the second threshold.

2. The monitoring device according to claim 1, wherein the first PUF information change value is a degree of difference between the PUF information acquired at the previous time and the PUF information acquired at the current time.

3. The monitoring device according to claim 1, wherein the first PUF information change value is a rate of change of PUF information with respect to time from the PUF information acquired at the previous time to the PUF information acquired at the current time.

4. The monitoring device according to claim 1, wherein the second PUF information change value is a degree of difference between the initial PUF information and the PUF information acquired at the current time.

5. The monitoring device according to claim 1, wherein the second PUF information change value is a rate of change of PUF information with respect to time from the initial PUF information to the PUF information acquired at the current time.

6. The monitoring device according to claim 1, further comprising an unauthorized use warning unit configured to give a warning in a case in which there is unauthorized use of the predetermined monitoring target device.

7. The monitoring device according to claim 1, further comprising a deterioration warning unit configured to give a warning in a case in which the predetermined monitoring target device has deteriorated.

8. The monitoring device according to claim 7, wherein the deterioration warning unit is configured to give a warning with a warning level changing in a stepped manner in accordance with the degree of change in the second PUF information change value.

9. The monitoring device according to claim 1, wherein the PUF information acquiring unit is configured to regularly acquire the PUF information at a predetermined cycle time.

10. The monitoring device according to claim 9, further comprising a cycle changing unit configured to change the predetermined cycle time such that it decreases in a case in which the rate of change of the acquired PUF information with respect to time has an increasing trend or change the predetermined cycle time to increase in a case in which the rate of change of the acquired PUF information with respect to time has a decreasing trend.

11. A monitoring method for monitoring a predetermined monitoring target device including a physically unclonable function (PUF) circuit, the monitoring method comprising:
    acquiring PUF information output from the PUF circuit by inputting a predetermined input value to the PUF circuit;
    calculating a degree of change from PUF information acquired at a previous time to PUF information acquired at a current time as a first PUF information change value;
    calculating a degree of change from initial PUF information to the PUF information acquired at the current time as a second PUF information change value;
    comparing the first PUF information change value with a first threshold and determining that there is unauthorized use of the predetermined monitoring target device in a case in which the first PUF information change value is greater than the first threshold; and
    comparing the second PUF information change value with a second threshold and determining that the predetermined monitoring target device has deteriorated in a case in which the second PUF information change value is greater than the second threshold.

12. A non-transitory computer-readable medium having a program recorded thereon, the program causing a monitoring device monitoring a predetermined monitoring target device including a physically unclonable function (PUF) circuit to function as:
    a PUF information acquiring unit configured to acquire PUF information output from the PUF circuit by inputting a predetermined input value to the PUF circuit;
    a first PUF information change value calculating unit configured to calculate a degree of change from PUF information acquired at a previous time to PUF information acquired at a current time as a first PUF information change value;
    a second PUF information change value calculating unit configured to calculate a degree of change from initial PUF information to the PUF information acquired at the current time as a second PUF information change value;
    an unauthorized use determining unit configured to compare the first PUF information change value with a first threshold and determine that there is unauthorized use of the predetermined monitoring target device in a case in which the first PUF information change value is greater than the first threshold; and
    a deterioration determining unit configured to compare the second PUF information change value with a second threshold and to determine that the predetermined monitoring target device has deteriorated in a case in which the second PUF information change value is greater than the second threshold.

\* \* \* \* \*